United States Patent [19]
Amberg

[11] 3,951,292
[45] Apr. 20, 1976

[54] PILFER-PROOF NECKBAND FOR A BOTTLE

[75] Inventor: Stephen W. Amberg, Toledo, Ohio

[73] Assignee: Owens-Illinois, Inc., Toledo, Ohio

[22] Filed: Oct. 15, 1974

[21] Appl. No.: 514,370

[52] U.S. Cl. ............................. 215/230; 215/232; 215/246; 215/252
[51] Int. Cl.² ....................................... B65D 41/54
[58] Field of Search .............. 40/311, 310; 215/232, 215/230, 246, 252; 53/42

[56] References Cited
UNITED STATES PATENTS

| | | | |
|---|---|---|---|
| 2,223,017 | 11/1940 | Abrams................................. | 215/246 |
| 2,758,735 | 8/1956 | Carter.................................. | 215/246 X |
| 2,790,286 | 4/1957 | Snyder................................. | 215/246 X |
| 2,954,139 | 9/1960 | Owens.................................. | 215/246 |
| 3,189,208 | 6/1965 | Jowett.................................. | 215/246 |
| 3,672,528 | 6/1972 | Faulstich.............................. | 215/256 |

Primary Examiner—Donald F. Norton
Attorney, Agent, or Firm—J. R. Nelson

[57] ABSTRACT

The disclosure relates to a label on a closured bottle, including a pilfer-proof feature. The neck label comprises a secondary closure in the form of a sleeve of a shrinkable oriented thermoplastic material shrunken snugly over the bottle and its closure skirt. The label stock is preprinted in a web and rolled as a supply, the roll width representing the label height. The label stock is (1) scored a partial depth of its thickness extending lengthwise along a line that is at a predetermined height in the final label and (2) pleated transversely at spaced intervals therealong. The pleats are spaced so that a predetermined number thereof appear in each label blank cut from the stock. Label blanks are cut to length, wound to an annular sleeve shape so that the trailing end of the blank overlaps the leading end and the overlapped ends united at an axial seam. The sleeves are placed over the neck and closure skirt of a closured bottle such that the score line of weakening in the material is adjacent the lower edge of the closure skirt. Heat is applied to shrink the label into snug surface engagement with the underlying surfaces. The pleats, especially on smaller sizes of ware, avoid wrinkles in the shrunken label and enhance a smooth appearance thereof. Preferably, the pleating in the label comprises at least a pair of pleats disposed on opposite sides and near the axial seam.

10 Claims, 17 Drawing Figures

U.S. Patent  April 20, 1976  Sheet 1 of 4  3,951,292
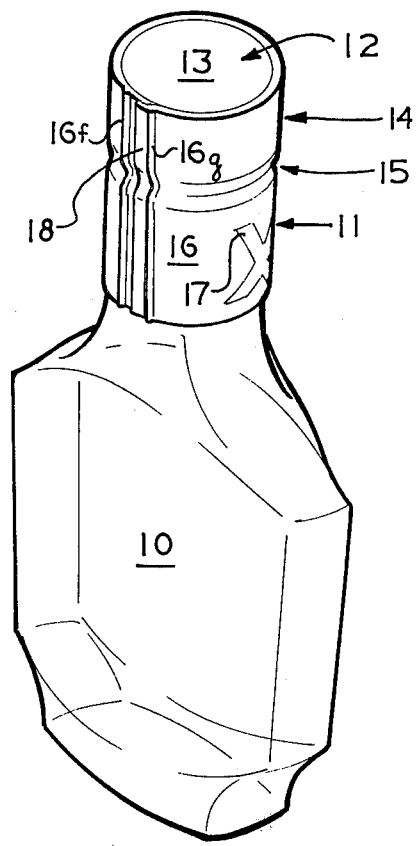
FIG. 1
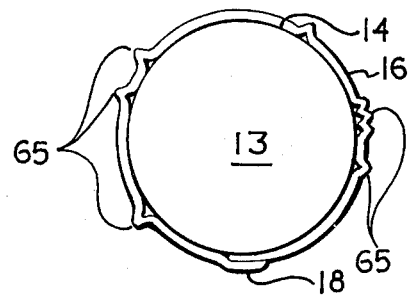
FIG. 13
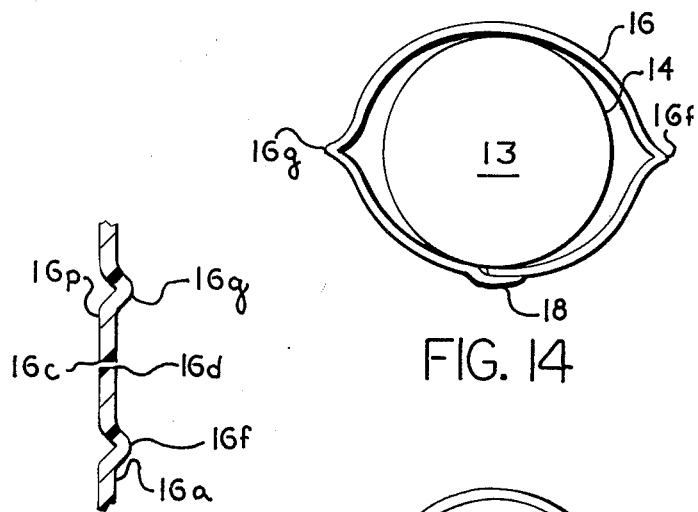
FIG. 14
FIG. 4
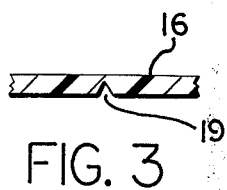
FIG. 3
FIG. 15
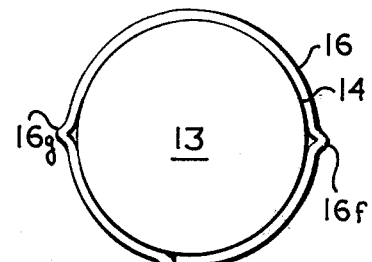
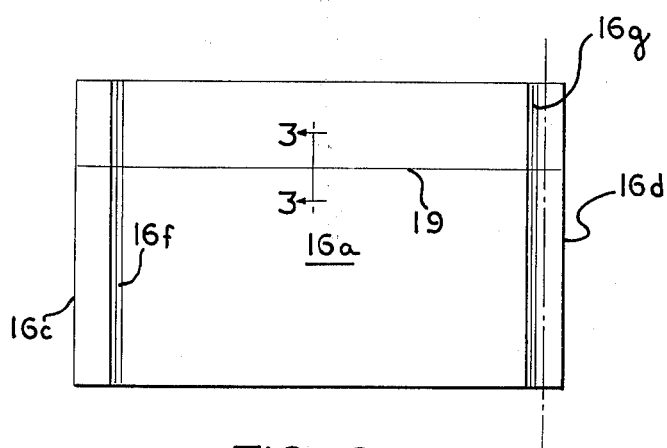
FIG. 2
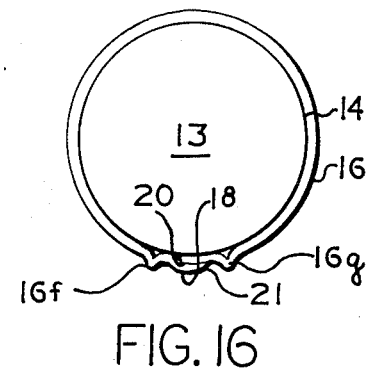
FIG. 16

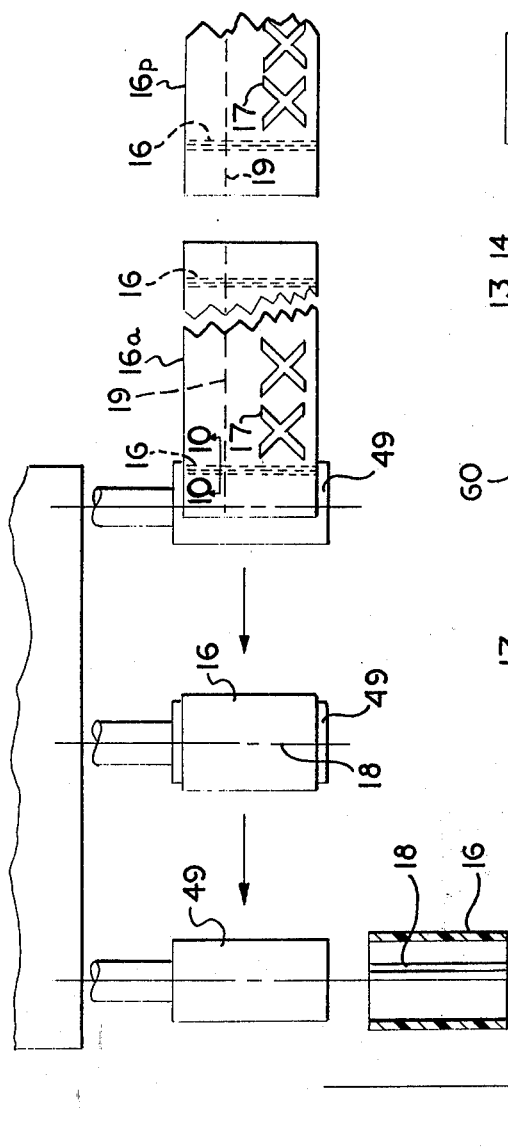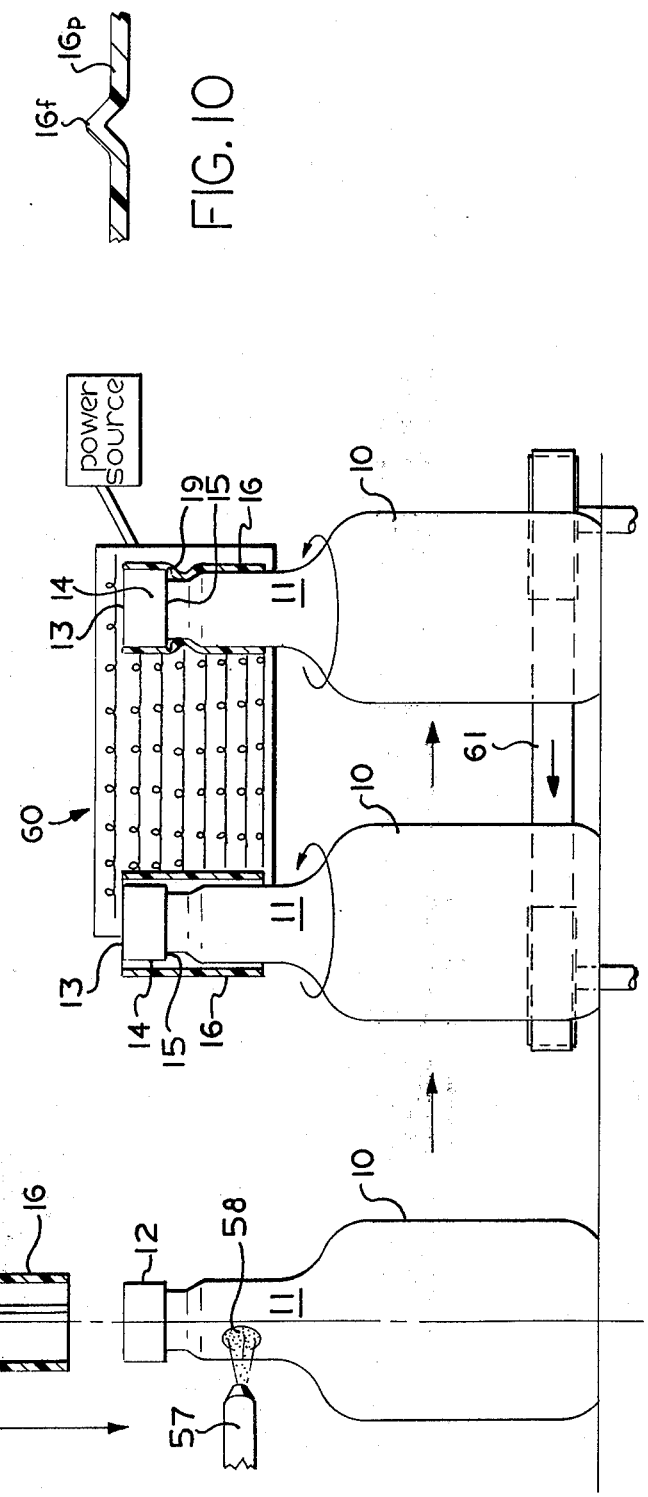
FIG. 10
FIG. 9

PILFER-PROOF NECKBAND FOR A BOTTLE

This invention relates to a neck label for a glass container comprised of an encircling element of shrunken plastic material. The neck label includes anti-wrinkling as well as pilfer-proofing features.

SUMMARY OF THE INVENTION

The neck label is formed from a prestretched and oriented ribbon or web of a cellular, organic thermoplastic that has been preprinted or decorated. The orientation of the plastic is a major amount along the longitudinal direction of the web. The web or ribbon is formed from a larger web of the material previously printed in flat form. The printed stock is sized to a width that represents the height of the label on the bottle.

As is preferred in the present invention, the oriented ribbon of label stock having the decorating repeated longitudinally therein is fed through a mechanism for performing two key operations. Although there is no critical order for doing same, the ribbon is partially slit lengthwise at the proper transverse location on the ribbon. By partially slit is meant that a knife edge cuts into the plastic to weaken it at a "score line" but without severing it. One example would be to cut into the ribbon of, say 10 thousands of an inch thickness, to a depth of 5 thousandths of an inch. This slit is made on the back side of the label stock, i.e. the side opposite the decorated surface thereof. After the label is applied and shrunken over the neck of the bottle and skirt of an applied closure cap, the encircling slit in the material will align approximately with the lower edge of the cap skirt. In opening the bottle, unscrewing the cap will annularly sever the label along the slit line into two parts, an upper on the cap skirt and a lower part on the neck of the bottle. This severing of the material in the secondary closure provides an indication that the bottle cap has been loosened or the bottle opened. The package is thereby provided with a pilfer-proof feature; that is, an indication to the consumer or user of the bottled product when a package has been prematurely opened.

The other feature of the invention is important in the application of an annular, shrink label on the neck of smaller bottles or when heat shrinking the annular label onto a "cold" (room temperature, for example) bottle. The ribbon is also repeatedly fluted in the cross dimension by compressing a line in the plastic causing a flute or pleat (much like in a pleated fabric). In shrinking the encircling label on the bottle and closure, especially in cases involving the smaller diameter bottles and closures or shrinking onto a cold bottle, the vertical fluting of the label concentrates wrinkling or gathering of the material along the flutes during shrinking. The smaller size necks on bottles require more flutes and the larger size necks require fewer flutes. In the preferred form of the invention, at least a pair of flutes is provided, and in one of the illustrated embodiments, the pair of flutes is located in close proximity to and on either side of the vertical seam of the annular label.

In the method of applying the labels of the invention, the ribbon or web of the oriented, preprinted stock having longitudinal continuous slit therein and the transverse flutes therealong is fed onto a drum where the proper lengths of the material (blanks) are cut in succession and placed onto mandrels. The blanks are individually wound on the mandrels and seamed by overlapping the trailing marginal end of the blank over its leading marginal end and united in the overlap by fusion, adhesion or such known means as may be convenient to form a sleeve of the material comprising the annular label. The preferred seam is one formed by fusion or a so-called "heat seal" of the two overlapping layers of plastic. The sleeve label is then shifted from the mandrel over the cap and neck of the bottle, and finally located at the proper elevation position thereon. In this position the slit, disposed annularly on the label, is in position adjacent the lower annular edge of the cap skirt, and the vertical flutes are on either side of the vertical lap seam of the sleeve.

Next the bottle, closure and label sleeve thereon are placed adjacent a heater device, such as infrared heat source, supplying sufficient heat locally to shrink the material of the sleeve into a snug fit about the bottle and cap skirt and form a secondary closure.

It may be preferred, as disclosed herein, to adhere the lower label section onto the neck of the bottle so that as the cap skirt is twisted to unscrew the cap, the lower section of the label is held stationary and the severing of the label into lower and upper sections on the neck and cap skirt, respectively, along the line of weakening is readily assured. This is accomplished by pretreating the glass surface of the neck of the bottle with adhesive prior to assembly of the sleeve label thereon. After the label shrinks snugly on the neck, the adhesive will bond the lower section of the label onto the glass for the function, as mentioned, in severing the secondary closure, at the slit line to provide the package with the pilfer-proofing feature.

It is therefore an object of the present invention to provide a shrink-type bottle label that will obviate wrinkles in the label area upon shrinking, and result in a label of superior appearance and function.

A further object of the invention is to provide a secondary closure overlying the neck of the bottle and at least the skirt portion of the cap thereon so as to include a pilfer-proof feature.

A still further object of the invention is to provide a pilfer-proof label over a bottle neck and closure skirt that will be readily severable into upper and lower portions on the cap and bottle neck, respectively, by attaching at least the lower portion of the label to the bottle neck surface at the time the label is applied by shrinking.

Another object of the invention is to provide such a label or secondary closure for convenient and economical application thereof onto bottles at production speed.

Other significant features, objects and advantages of the invention will occur to persons skilled in the art from the description appearing hereinafter and the related drawings.

BRIEF DESCRIPTION OF THE DRAWINGS

On the drawings appended hereto:

FIG. 1 is a perspective view of a bottle with a label applied and shrunken snugly over the skirt of the closure and the neck of the bottle.

FIG. 2 is a plan view of a label blank, before it is wrapped and seamed to a sleeve, showing the pleats and slit line thereof.

FIG. 3 is a sectional view taken along line 3—3 on FIG. 2.

FIG. 4 is a partial, sectional view of the pleated stock formed by the device of FIG. 7, after the web is severed by the device shown on FIG. 8.

FIG. 9 is a schematic view illustrating the steps of forming the label sleeve from a label blank made from the web of label stock, transfer of the label sleeve from the mandrel telescopically locating it in place over the bottle neck and closure, and shrinking it thereon.

FIG. 10 is a fragmentary, sectional view, taken along line 10—10 on FIG. 9, on the label blank of one embodiment of the invention illustrating the pleat made in the predecorated label stock from which the blank was made.

FIG. 13 is a partial top plan view of a bottle with a shrink-type label applied prior to the present invention.

FIG. 14 is a partial top plan view of a bottle and shrink-type label sleeve thereon prior to shrinking, illustrating the pleats in the label sleeve in accordance with the present invention.

FIG. 15 is a partial top plan view of the bottle and label of FIG. 14 after shrinking the label onto the bottle and cap.

FIG. 16 is a partial top plan view of another embodiment of a label shrunken onto the bottle neck and cap in accordance with the present invention.

DETAILED DESCRIPTION OF THE DRAWINGS

Figure 5:
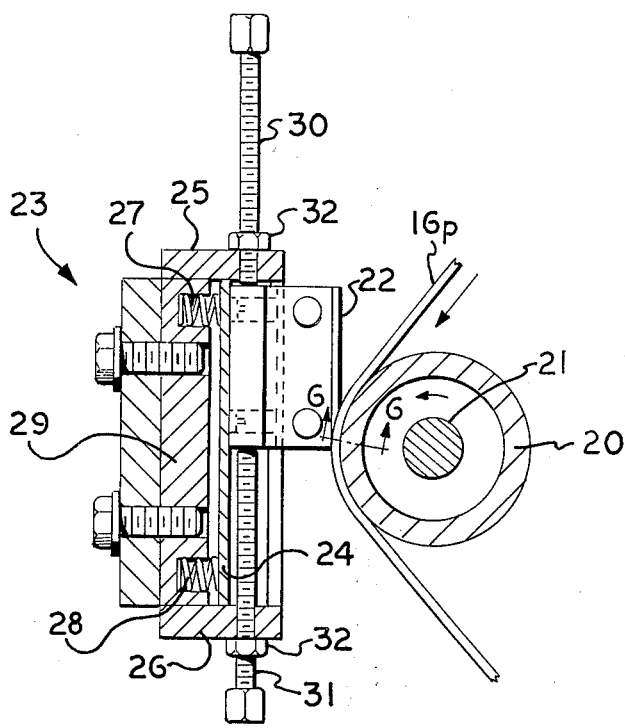
FIG. 5 is a sectional plan view of a device forming a partial depth slit in the label stock material running longitudinally of a web of the material.
Figure 6:
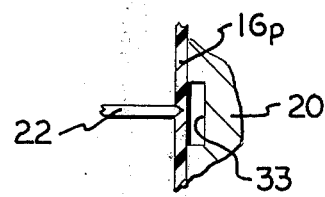
FIG. 6 is a fragmentary sectional view taken along line 6—6 on FIG. 5.
Figure 7:
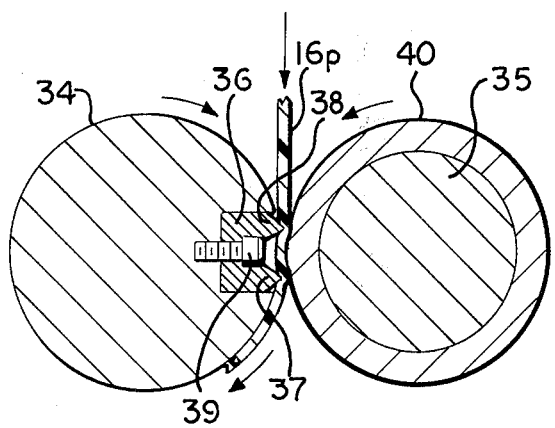
FIG. 7 is a sectional plan view of a pleating device forming spaced apart transverse pleats, in pairs, in the label stock material in web form, which is illustrated of one of the embodiments of the invention.

Referring to the drawings, FIG. 1 shows a glass bottle 10 including a neck 11 closed by a primary closure, such as a screw cap 12. Cap 12 (FIG. 9) includes a top 13 and an integral skirt portion 14 that terminates in a lower annular edge 15 along the neck 11.

A shrunken secondary closure 16, in the form of a pilfer-proof neck and closure label, made of a shrinkable, cellular polymeric material encircles bottle neck 11 and skirt 14 of cap 12, bridging the juncture between the neck of the bottle and the skirt edge of the cap. The shrinkable polymeric material may be any of the forms of shrinkable organic foamed thermoplastics which may be highly oriented in a dimension that extends circumferentially on the bottle of FIG. 1. An example of such material is a cellular polymer material that is highly oriented in a web or sheet form and preprinted with a label decoration or image illustrated at 17. Preferably, the polymer material, such as a foamed polystyrene, polyethylene or polypropylene, should be on the order of 0.005 to 0.020 inches in thickness and of a bulk density of about 6–40 lb./cu. ft.

The label 16 is formed from a blank 16a of the material illustrated on FIG. 2. The inside surface of the label is shown on FIG. 2, i.e. the surface that will be next to the neck surface of bottle 10. Label blank 16a is formed from a parent web 16p of the material that is sized in width to correspond with the desired height dimension of the label, this dimension being along the side 16c of the blank. Label blank 16a is sized in a length dimension along the longitudinal direction of the web 16p that is in excess of the circumference of the bottle neck or closure, whichever is larger, of the bottle 10, closure 12 combination.

Label blank 16a is wrapped into a sleeve form by overlapping the marginal leading and trailing ends 16c and 16d thereof, and the overlapped ends are connected together along an axially extending seam 18. The label formed in accordance with the invention may possess either or both of two important features. A pilfer-proof secondary closure 16 is provided by the lengthwise partial depth slit 19 in the web 16p which appears in the label blank on FIG. 2. This slit should be of sufficient depth to provide a line of weakening in the material extending around the circumference of label 16 and adjacent the lower edge 15 of the cap skirt. Slit 19 is shown on FIG. 3 in cross-section and is in depth approximately one-half of the web 16p thickness, e.g. one-half the thickness of the label blank 16a.

Label blank 16a also contains plural spaced apart pleats, e.g. 16f and 16g. In the preferred embodiment of the invention, pleats 16f and 16g are placed in spaced apart relationship so that one of the pleats 16f is near the leading edge 16c of a blank 16a in web 16p, and the other pleat 16g is near the trailing edge 16d. When the leading and trailing edges 16c and 16d of the blank are overlapped and seamed at 18, the pleats 16f and 16g are very close to that seam, as shown on FIG. 16. The pair of pleats 16f and 16g, or more if needed, absorb wrinkles in the label that tend to form in the shrinking of the label onto the bottle neck and primary closure. By localizing the wrinkles in the pleats near the seam 18, a better appearance is obtained in the label and the overall appearance of the package is enhanced.

Another embodiment of the invention is illustrated in FIGS. 14 and 15. The label has pleats 16f and 16g distributed in label blank 16a so that they will be approximately diametrically opposite each other in the sleeve form of the label 16 (FIG. 14). After shrinking, the pleats remain on opposite sides of the bottle and cap (FIG. 15).

FIG. 13 is an illustration of the type of wrinkling which often occurs in a sleeve label that is not prepleated when shrunken onto an ambient temperature bottle filled with product. The wrinkles (indicated at 65 on FIG. 13) are believed to be caused by shrinking a label 16 of the foamed organic thermoplastic material onto a "cold" bottle and the wrinkles 65 will appear at random in the label's peripheral outer surface and distort or otherwise affect the image of the label. By using the present invention (FIGS. 14–16), any such wrinkles are localized and controlled to obtain a satisfactory appearance of the label image. By "cold" bottle is meant a filled bottle of ambient temperature, or cooler than the temperature for boiling water. In the practice of shrinking foamed thermoplastic onto bottles, it has been found that preheating the glass or bottle surface above 225°F will avoid wrinkling; however, when the bottle is filled with product, such as food or beverage, preheating the bottle in this temperature range is impractical. Accordingly, the present invention provides a means for satisfactory labeling without preheating the bottle and its contents.

Referring now to FIGS. 4–7, the web of the foamed thermoplastic material 16p is fed from a supply (not shown) of the predecorated label stock moving over a roll 20 which is supported on a vertical shaft 21. The partial depth slit 19 is made in the label stock on the back side or unprinted surface thereof by a blade 22 carried in the stationary holder assembly 23. Blade 22 is fastened in a longitudinal groove of a guide member 24 that is retained between the sides 25 and 26 of holder 23 and normally urged outwardly by springs 27 and 28 in the back plate 29. Blade 22 is adjusted longitudinally on the guide member 24 by the opposed adjusting screws 30 and 31, respectively, threaded in the sides 25 and 26 and each held in place by a lock nut 32. This adjustment compensates for wear in blade 22.

Blade 22 is supported opposite an annular recess 33 in roll 20 (FIG. 6), and as the web 16p is driven over roll 20, the slit 19 is made continuously lengthwise of the label stock web at the proper height thereof so as to correspond to the elevation in the label, as applied, opposite or adjacent the lower edge 15 of the primary closure skirt.

After processing over roll 20, the label stock web 16p passes between the rollers 34 and 35 also rotatable on vertical shafts. Roller 34 is provided with the pleat insert tool 36 which extends axially of the roll over the width of the web. Pleat tool 36 related to the embodiment of FIGS. 2, 4 and 16 is provided with a pair of relatively closely spaced pleat forming tips 37 and 38 and the tool 36 is held in roller 34's recess by screws 39. The surface portion 40 of roll 35 is of a relatively yieldable material, such as rubber or the like, preventing fracture of the more or less crushed web along the apex lines of tips 37 and 38.

Figure 8:
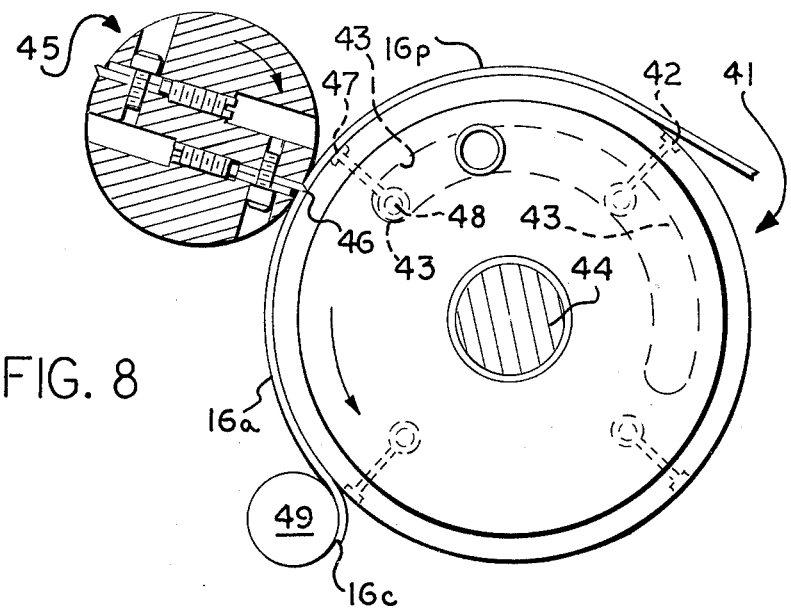
FIG. 8 is a sectional plan view of a device for cutting a label blank from the web of label stock and feeding the label blank to a mandrel.

Referring to FIG. 8, the label stock web 16p next is brought over feed drum 41 and picked up by a forward vacuum port 42 that is connected to stationary vacuum manifold 43 supported over the top side of the drum. Drum 41 is rotated on a vertical shaft 44 at a speed in excess of the moving speed of the web 16p up to this point. This creates a taut condition in web 16p on drum 41 and causes some slippage between the two. A rotary knife 45 timed to the linear speed of web 16p carries a vertical blade 46 which severs the web transversely on drum 41 and cuts from the web a label blank 16a of proper length, such as shown on FIG. 2. The web stock is fed over the feed drum 41 such that the decorated surface thereof is next to the drum peripheral surface. In other words, the cut is made from the back side of web 16p in relation to the front or decorated side. Just ahead of knife 46, a second vacuum port 47 is holding the web in place by vacuum connected through its passage 48 just about to break its connection with vacuum manifold 43.

The label blank 16a that is cut and on feed drum 41 beyond knife 46 has its leading edge 16c being wrapped on mandrel 49 on a rotary turret, which is simultaneously wrapping and pulling the label blank from the feed drum after the mandrel picks it up from the drum's surface.

Figure 11:
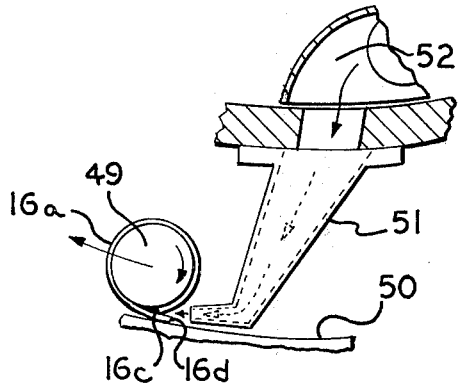
FIG. 11 is a plan view, partly broken away, of the device for making a "heat seal" seam on the overlapping ends of a label blank treated in FIG. 9 to form the label sleeve of the invention.
Figure 12:
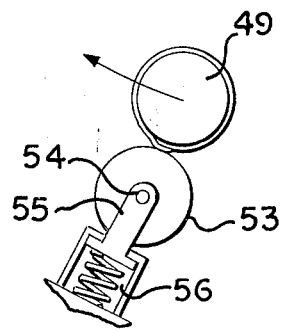
FIG. 12 is a companion view to FIG. 11, schematically illustrating a means for applying some pressure to the heated overlapped end portions of the label sleeve treated in accordance with FIG. 11.

The several mandrels 49 are part of a machine assembly shown schematically on FIGS. 11 and 12. Label blank 16a is held on the mandrel 49 near leading edge 16c by a vacuum, and mandrel 49 is rotated clockwise (FIG. 11) while moving in an arcuate path along a guide rail 50 which controls the unwound trailing part of label 16a. The mandrel device includes an air nozzle 51 which passes over a manifold connection at 52 on the machine and receives hot air therefrom. Manifold 52 is stationary on the machine and nozzle 51 moves in an arc path past it to make this connection for supplying the hot air to the nozzle tip at the time the label is nearly wrapped on the mandrel and is in an end-over-lapping fashion shown on FIG. 11. The hot air is applied by the tip of nozzle 51 into the space between the overlapping ends 16c and 16d of the label blank. Thereafter, as sufficient heat is applied by the nozzle, the mandrel continues to rotate and completely overlap and join the ends of the label into a sleeve. The ends are finally joined at a subsequent movement of the mandrel in its path whereat the overlapped ends of the label are compressed by engagement with the wheel 53 (FIG. 12). Wheel 53 is mounted on a vertical pivot 54 and bracket 55 which is part of a spring mounting 56 (shown schematically). As the mandrel and label sleeve move past wheel 53, the interference of the wheel surface on the overlapped vertical seam of the label sleeve compresses the heated portions of the plastic into a firmly bonded joint or seam.

Referring to FIG. 9, the assembly functions of the label on the container are illustrated schematically. As shown near the top of the Figure, a cut label blank 16a is wrapped on a mandrel 49 and seamed, as previously described, and thereafter stripped from the mandrel in a vertically, downwardly direction. The bottle 10 having a primary closure 12 thereon is first transported past a glue applicator nozzle 57. A spot 58 of hot melt adhesive is sputtered or sprayed from nozzle 57 onto the surface of neck 11 of the bottle in a region over which the label 16 will be applied.

Next, the bottle neck 11 and closure 12 receive a sleeve label 16 of the cellular, shrinkable thermoplastic material, which is lowered to a position whereat the annular slit line 19 on the inside surface of sleeve 16 is disposed at or just below the lower edge 15 of cap skirt 14. While the label is in this position on bottle neck and cap, the bottle is carried past a heating device 60, illustrated schematically, preferably in the form of an infrared electric heater. During movement past heater 60, bottles 10 are revolved by sidewall engagement with a moving belt 61, traveling counter to the direction of travel of bottles 10. Another form of heater is the usual tunnel structure through which the bottles and sleeves are conveyed and heated by circulated hot air or the like. Regardless of the form of heater, the sleeve material is heated externally sufficiently to shrink it onto the neck and cap in a snug conforming relationship, as illustrated at the right-hand side of FIG. 9.

It is during this shrinking phase of the process that the present invention of the pre-pleated material in the label sleeve affords the means for providing a satisfactory neck and closure label on the bottle. The heat being applied externally onto the shrinkable material, i.e. heat from one side only of the material, results in a differential in the shrinking rate of the material across its thickness. Since the material is cellular, it also serves as a heat insulator and retards transmission of heat toward the inner surface. In any event, under these conditions, wrinkles tend invariably to appear in the shrunken label. The present invention provides an economical and practical way to overcome this problem.

As mentioned, the label stock may also be pleated with the single flute pleat as shown on FIG. 10, the pleats in a label blank length being spaced so that they are disposed as shown on FIGS. 14 and 15. It should be understood that the invention applies to pleat means in the label to absorb or concentrate the wrinkles. The number of pleats in a given label length of material may be determined empirically for a particular shape and design of bottle and type and material of the label. It has been found in smaller sizes of bottle neck designs, several pleats are advantageous, i.e. as many as six per label. The extreme of this design of pleats in a label would be a completely fluted (corrugated) label wherein the pleats are repeated continuously around the periphery of the label sleeve.

Figure 17:
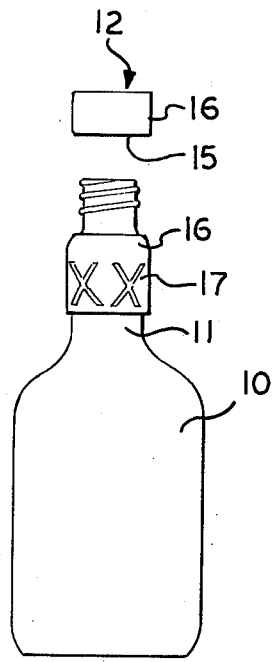
FIG. 17 is an elevational view of the labeled bottle of the invention as it is opened by unscrewing and removing the cap, and label being severed into upper and lower portions.

Referring to FIG. 17, the pilfer-proof feature of the label is illustrated. Upon turning the closure 12, label 16 will sever annularly along slit line 19 and separate the label into two parts, i.e. an upper part on the skirt of closure 12 and a lower part adhesively secured to the bottle neck region. The closure may be reapplied and the label decoration, etc. is maintained; however, the line of severance will indicate premature opening or pilfering. If the product is free of pilfering at the retailer's shelf, the label 16 will be continuous and unbroken (not severed).

Having shown and described preferred embodiments of the invention, further changes, modifications and substitutions may be made by those ordinarily skilled in the art without departing from the spirit and scope of the invention as defined in the appended claims; wherein I claim:

1. A labelled container comprising a bottle having a neck portion and a mouth opening at the outer axial end thereof, a closure applied over the mouth opening for closing the container, said closure having an annular skirt, a seamed sleeve-type preprinted label comprised of a sheet of a heat shrinkable, organic foamed thermoplastic material of at least 0.005 inch thickness, said foamed material having a bulk density of from 6 to 40 lbs. per cubic foot, and is highly oriented in its circumferential dimension, said sleeve label encircling said neck portion and the skirt of said closure and having plural, axially extending pleats and an axially extending seam formed by the overlapping ends of the sheet united together, said label being shrunken into snug fitting engagement with said neck and skirt, respectively, the pleats being disposed as vertical flutes on the labelled bottle in annularly spaced relationship about the exterior surface of said label and on either side of said axial seam.

2. A labelled container as defined in claim 1, wherein the label includes a partial depth endless annular slit on the interior surface of the label so as not to be visible on the exterior of the label, said slit being disposed adjacent the annular skirt edge of the closure and the neck of the bottle, said label being severable along said slit upon rotary movement of the closure on the bottle, any such severing signifying pilfering of the closed container.

3. A labelled container as defined in claim 2, including an adhesive means affixing the sleeve to at least the neck of the bottle, whereupon severing the label by any said opening movement separates the label into two separate annular parts, the lowermost part thereof being retained adhesively on the neck of the bottle.

4. A labelled container as defined in claim 3, wherein the label is comprised of foamed polystyrene of a thickness in the range of 0.005 – 0.020 inch.

5. A labelled pilfer-proof container comprising a bottle having a neck portion and a mouth opening at the one end thereof, a closure applied over the mouth opening closing the container, said closure including an annular skirt portion terminating in a lower annular edge, a sleeve formed of pre-printed, heat shrinkable, cellular polymeric sheet material that is at least 0.005 inches in thickness, has a bulk density in the range of 6–40 lb. per cubic foot and is highly oriented in a dimension that extends circumferentially on the bottle, the sleeve encircling the overlying said neck portion and the skirt portion of said closure, said sleeve having a partial depth endless slit encircling the inner circumferential surface thereof that is substantially non-visible exteriorly on the labelled container and disposed adjacent the annular edge of said closure, the sleeve of said material being in a shrunken snug fitting engagement with said neck and skirt, respectively.

6. The labelled, pilfer-proof container of claim 5, including an adhesive means on the neck portion of the bottle attaching a portion of the sleeve disposed below said endless slit firmly on the neck, whereby upon opening the closure the sleeve is affixed to the neck and severable at said endless circumferential slit.

7. The labelled, pilfer-proof container of claim 6, including plural axially extending pleats spaced about said sleeve, the latter including an axially extending seam, the pleats forming axial raised formations on the label that are disposed in annularly spaced apart relationship thereon on either side of the label's axial seam.

8. A one-piece tamper-proof device in combination with the neck and rotatable closure of a bottle comprising a secondary closure for encircling the closure and bottle neck with a circumferentially highly oriented, heat shrunken, cellular, polymeric material of at least 0.005 inch thickness, said secondary closure being provided with an annular endless slit on the surface thereof adjacent the bottle that forms an exteriorly non-visible predetermined line of weakening therein encircling the lower annular edge of the closure on the bottle, said slit providing a line of severance of the secondary closure for severing it into closure and neck related portions upon a subsequent rotary movement of the closure, and an adhesive interposed between the bottle neck surface and the surface of the secondary closure adjacent thereto, whereby a visual indication of tampering is provided by severing the secondary closure along said annular slit.

9. A printed neck label device bearing a decorative image on the exterior surface thereof for application to the neck of a bottle, comprising a decorated plastic annular, axially seamed, endless label for encircling a bottle neck comprised of heat shrinkable, cellular polymeric material that is highly oriented in the circumferential dimension of said annular endless label, said material having a bulk density in the range of 6–40 lb. per cubic foot and a thickness of at least 0.005 inches, said label having pleat means formed therein extending angularly across the highly oriented dimension of said label material, whereby wrinkling in the label from heat shrinking application on the neck of the bottle is concentrated at said pleat means affording a wrinkle free label image.

10. A one-piece tamper-proof label device for use with the neck and rotatable closure of a bottle comprising a secondary closure for encircling the closure and bottle neck comprised of a heat shrunken, cellular, polymeric material that is highly oriented in the encircling dimension of said label, is at least 0.005 inch thick and has a bulk density in the range of 6–40 lb. per cubic foot, said secondary closure being provided internally with (1) an endless annular partial depth slit line of weakening in said material and disposed thereon on the interiorly facing surface of the label, the endless slit being positionable adjacent the lower edge of a closure, a (2) pleat means extending substantially axially thereof and angularly disposed with respect to said highly oriented dimension of the material in the label, said slit providing a line of severance of the secondary closure into closure and neck related portions upon subsequent relative rotary movement of such portions, thereby providing a visual indication of tampering upon fracture of the secondary closure along said partial depth slit, and said pleat means localizing wrinkling in the label as may arise from heat shrunken applications onto a bottle neck and closure.

* * * * *

UNITED STATES PATENT OFFICE
CERTIFICATE OF CORRECTION

PATENT NO. : 3,951,292
DATED : April 20, 1976
INVENTOR(S) : Stephen W. Amberg

It is certified that error appears in the above-identified patent and that said Letters Patent are hereby corrected as shown below:

Col. 1, line 21, change "decorating" to --decoration--.

Col. 3, line 11, change "illustrated" to --illustrative--;
     line 48, change "and" to --the--.
Col. 4, line 39, after "blank" insert --16a--.

In the Claims:

Claim 5 (Col. 8, line 16), change "the" second occurrence to -- and --.

Claim 10 (Col. 10, line 1), change "a" to --and--.

Signed and Sealed this

Eighth Day of February 1977

[SEAL]

Attest:

RUTH C. MASON
*Attesting Officer*

C. MARSHALL DANN
*Commissioner of Patents and Trademarks*